May 21, 1929.  L. E. WHITON  1,713,802
CHUCK
Filed Aug. 23, 1926  2 Sheets-Sheet 1
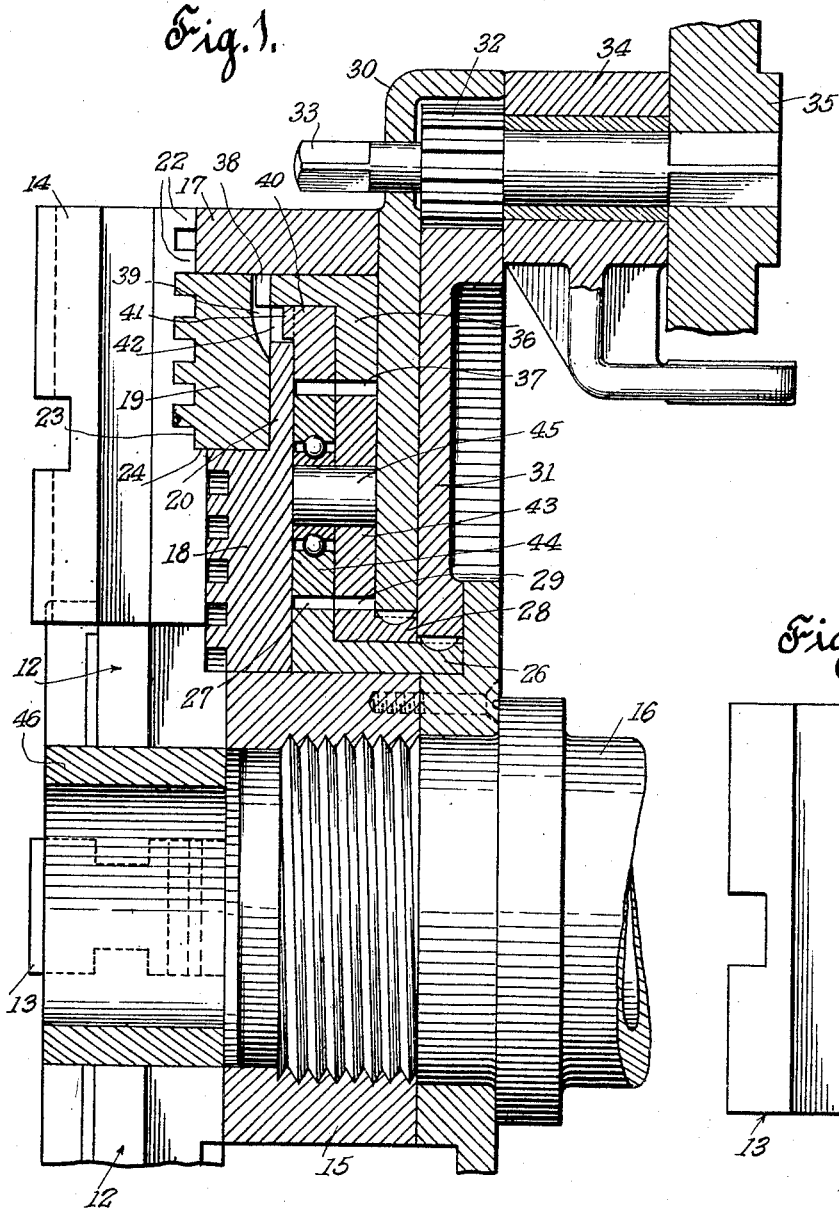
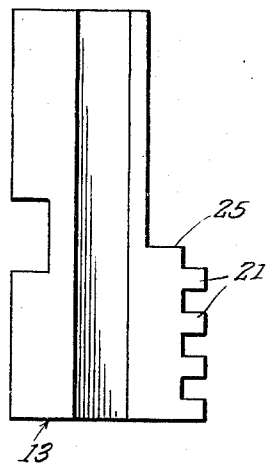
INVENTOR
Lucius E. Whiton
BY
ATTORNEY

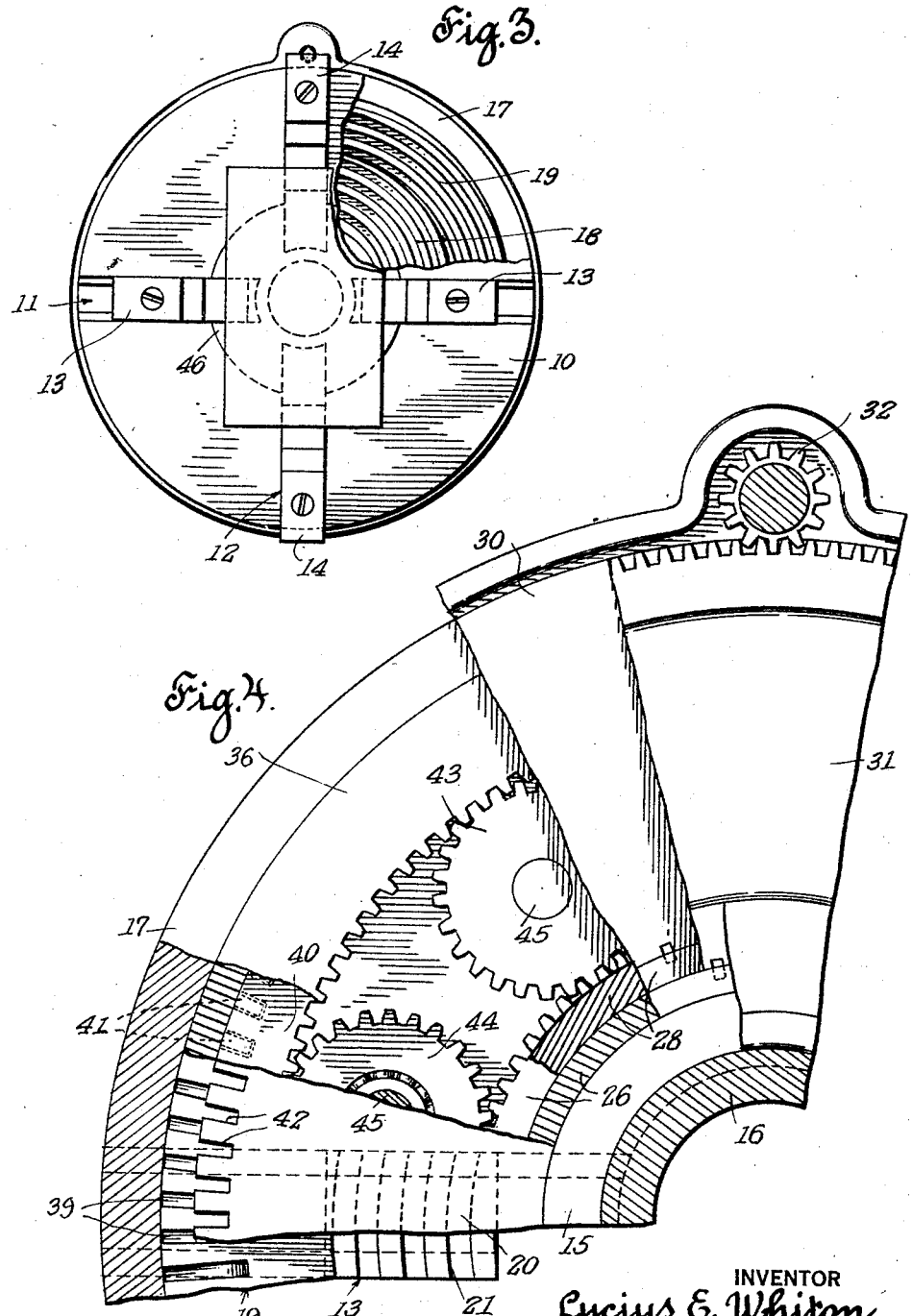

Patented May 21, 1929.

1,713,802

UNITED STATES PATENT OFFICE.

LUCIUS E. WHITON, OF NEW LONDON, CONNECTICUT.

CHUCK.

Application filed August 23, 1926. Serial No. 130,964.

My invention relates particularly to what are commonly termed lathe chucks.

One object is to provide a chuck which can be conveniently and effectively used for the holding of irregularly shaped pieces, such as elliptical or rectangular.

Another object is to provide means for equalizing the gripping pressure on opposing pairs of a four-jaw chuck.

Another object is to provide a chuck of this character which can be adjusted while the chuck is rotating.

Another object is to provide a chuck of this character which is self-contained and compact, and through which the stock or tools may be fed while the chuck is in action.

In carrying out the invention in its preferred form, I employ two concentric scroll plates for operating, respectively, on two pairs of jaws. These scroll plates or rings are provided with spiral threads of the same pitch but extending in opposite directions. Differential mechanism is provided for rotating the scroll rings regardless of whether the chuck is stationary or rotating. This differential mechanism has a planetary gear train mounted within the chuck, with its gears connected to the scroll rings so as to provide an automatic equalizing torque, as will be hereinafter understood.

Fig. 1 is a longitudinal sectional view showing a fragment of a chuck embodying my invention, showing one of the jaws in side elevation.

Fig. 2 is a side view of one of the other jaws.

Fig. 3 is a front or end view of a chuck embodying my invention, part of the face of the chuck being broken away to show the scroll rings and a rectangular piece of stock being shown gripped by the jaws.

Fig. 4 is a fragmentary rear view, parts being broken away, and other parts being shown in section.

The chuck body 10 may be of any suitable construction and provided with guideways such as 11 and 12 for the pairs of jaws 13—13 and 14—14. These jaws may be of any suitable type. Only the bases of the jaws are shown in Figs. 1 and 2.

The body is provided with a hub 15 adapted to be attached to a lathe spindle 16 in any suitable manner. In the form shown, the chuck and the lathe spindle are hollow so that the stock or tools may be fed through the center.

The chuck also preferably has a flange 17 at its outer edge and provides a recess or chamber between the hub 15 and the flange 17 for the scroll rings or plates 18 and 19. The inner ring 18 is mounted on the hub 15 and is provided with an extension 20 behind the ring 19, which extension may be integral, as shown, or formed as a separate ring attached in any suitable manner. The outer scroll ring 19 preferably fits within the flange 17 and surrounds the scroll ring 18. The scroll ring 18 has a thread which meshes with teeth 21 in the jaws 13—13, and the scroll ring 19 has a thread which meshes with teeth 22 in the jaws 14—14. The outer ring 19 has an edge 23 which serves as a stop or abutment for the shoulders 24 and 25 of the jaws 14 and 13, respectively, to limit their outward movement.

On the hub 15 in rear of scroll ring 18, is a sleeve 26 having spur gear teeth 27. Another sleeve 28, mounted on sleeve 26, has spur gear teeth 29, corresponding to the teeth 27. These two sleeves 26 and 28 are adapted to be rotated with respect to each other in any suitable manner. In the form shown, the sleeve 28 is keyed to a stationary plate 30 and the sleeve 26 is keyed to a gear plate 31. This gear plate is adapted to be rotated by a pinion 32 on the shaft 33. This shaft is supported in a bearing 34 and adapted to be rotated either by an ordinary wrench from the outer end or by a power driven gear 35 at the rear.

An annular ring 36 is mounted within the flange 17 of the chuck body and provided with teeth 37 facing toward gear teeth 29. This annular gear ring has teeth 38 clutched with teeth 39 in the rear of the scroll ring 19. Another annular gear ring 40 with teeth corresponding to the teeth 37 is mounted within the ring 36 with its teeth facing toward teeth 27 of the sleeve 26. This annular gear 40 has teeth 41 in clutched engagement with teeth 42 in the outer edge of the flange 20 at the periphery of the scroll ring 18.

Between the inner and outer gear members are mounted a number of pairs of planetary pinions. Each pair consists of a pinion 43 and a pinion 44 mounted on a stud or short shaft 45. These planetary pinions and their shafts are guided between a scroll member 18 and the abutment plate 30.

Normally, when the chuck is rotating, the two members 30 and 31 and the connected gear members 29 and 27, are stationary. As the chuck body rotates, of course, the jaws and scroll rings rotate with the body and at the same angular velocity, thus carrying with them the outer angular gear members 36 and 40. This means that the planetary pinions travel around the stationary gears 29 and 27. By rotating member 31 relative to the other member 30, the pinions 44 will be compelled to rotate on their shafts 45 and thus rotate the gear ring 40 with respect to gear ring 36. This will, in turn, carry with it the inner scroll ring 18 so as to move the jaws 13 in or out, as the case may be, depending upon the direction of rotation of the scroll plate. When the jaws 13 meet with sufficient resistance to radial movement, the rotation of the scroll ring 18 with respect to the chuck body 17 will, accordingly, cease and the torque about the axis of the chuck will then be transmitted through the pinion shafts 45 to the pinions 43, and thus compel the rotation of the outer annular gear members 36 and scroll plate 19, thus transmitting motion to the jaws 14 until the pressure is equalized, the action being a good deal like that of a pair of forceps in which, when one handle is fixed and the other is moved, the jaws must open and close according to the movement applied to the free handle. That is, power applied to one of the pinions would tend to cause the external gears 36 and 40 to move in opposite directions, and if resistance is met with, the power applied would be equalized between the oppositely moving external gear rings. By providing the scroll rings with threads of opposite direction, the opposite movement of the separate scroll rings will tend to close both pairs of jaws on the work or expand both jaws within the work, as the case may be. On an elliptical piece, for instance, the pair of jaws which close against the long diameter will cause one of the scroll rings to cease revolving, whereupon the other scroll ring will continue to revolve until the other pair of jaws closes against the short diameter and thereafter power applied will result in equal pressure on all four jaws through the forceps action above described.

In the form shown, a pilot bushing 46 is mounted in the chuck body and serves as an abutment to limit the inward travel of the respective jaws.

It should be understood that other changes in construction and arrangement may be made without departing from the spirit or scope of my invention, as set forth in the accompanying claims.

I claim:

1. A lathe chuck comprising a body having guide ways, jaws guided therein, two rotatable scroll plates one surrounding the other and having oppositely directed spiral threads for operating said jaws, and means for rotating one of said scroll plates relative to the other while said body in rotating.

2. In a chuck, two independently rotatable jaw-operating plates, an annular member having a clutch engagement with one plate, a second annular member arranged alongside of and having a flange extending around the first mentioned annular member, said flange having a clutch engagement with the other plate and means for turning one annular member with respect to the other annular member.

3. A chuck comprising a body, a scroll plate mounted to rotate on the body, a second scroll plate mounted to rotate on the first scroll plate, two abutment members, one of which is rotatable with respect to the other, inner gears connected respectively to said abutment members, outer gears connected respectively to said scroll plates, and a pair of planetary pinions on a common shaft mounted between the inner and outer gears and guided between one scroll plate and one abutment member.

4. A chuck comprising a body, two scroll plates mounted to rotate in the body and having oppositely directed spiral threads, two abutment members, means for rotating one abutment with respect to the other, two spur gears connected respectively to said abutment members, two annular gears connected respectively to said scroll plates, and a pair of pinions on a common shaft mounted for planetary movement between the spur and annular gears and guided between one scroll plate and one abutment member.

5. In a chuck, a body, jaws guided therein, and two adjusting plates, one of said plates surrounding the other, some of said jaws being geared to the outer plate and extending freely over the inner plate and other jaws being geared to the inner plate and extending freely over the outer plate and a planetary gear train for rotating both plates while the body is rotating.

6. A chuck having a body with pairs of radially movable jaws in a common plane, two concentric scroll plates having oppositely directed threads engaging the jaws of the respective pairs, and means for rotating one scroll plate with respect to the other while said chuck body is rotating and for moving the pairs together or independently depending upon the resistance incurred.

7. In a chuck, a body having a hub and two pairs of radially adjustable jaws, a scroll plate rotatable on said hub and having a spiral thread engaging one pair of jaws, a second scroll plate surounding part of the first scroll plate and having a spiral thread engaging the other pair of jaws, the threads of the two scroll plates extending in opposite directions, and a planetary gear train for driving the two scroll plates while the chuck is rotating.

8. A chuck comprising a body having guideways, jaws in said guideways, a scroll plate engaging one jaw for adjusting it, another scroll plate surrounding the first mentioned scroll plate and engaging another jaw for adjusting it, annular gears arranged adjacent each other and connected respectively to the two scroll plates, two gears arranged inside of said annular gears, a planetary pair of pinions travelling between said two gears and the outside annular gears, and means for rotating one of said inner gears relative to the other while the chuck is rotating.

LUCIUS E. WHITON.